United States Patent [19]
McMahon

[11] 3,908,168
[45] Sept. 23, 1975

[54] RADIO TRANSMISSION SYSTEM
[75] Inventor: John E. McMahon, West Covina, Calif.
[73] Assignee: UDAK Corporation, West Covina, Calif.
[22] Filed: Dec. 6, 1973
[21] Appl. No.: 422,581

[52] U.S. Cl. .................... 325/1; 325/118; 325/152
[51] Int. Cl.² .......................................... H04B 7/14
[58] Field of Search .......... 325/1, 15, 16, 26, 6, 64, 325/66, 118, 152; 340/225

[56] References Cited
UNITED STATES PATENTS
3,290,597  12/1966  Denny et al. ................... 325/6 X
3,699,443  10/1972  Weger ............................. 325/6 X FOREIGN PATENTS OR APPLICATIONS
740,988  8/1966  Canada ............................ 325/16

Primary Examiner—Benedict V. Safourek
Attorney, Agent, or Firm—Fred N. Schwend

[57] ABSTRACT

A radio transmission system for use by the operator of a motorcycle or other vehicle subject to high background noise, comprising a helmet worn by the operator and carrying a small low powered transmitter including a microphone located adjacent the operator's mouth at all times. A small receiver carried by the motorcycle is tuned to the frequency of the transmitter and its output is connected by a wire conductor to the input of a relatively high powered transmitter carried by the motorcycle and operating on a different frequency.

3 Claims, 6 Drawing Figures

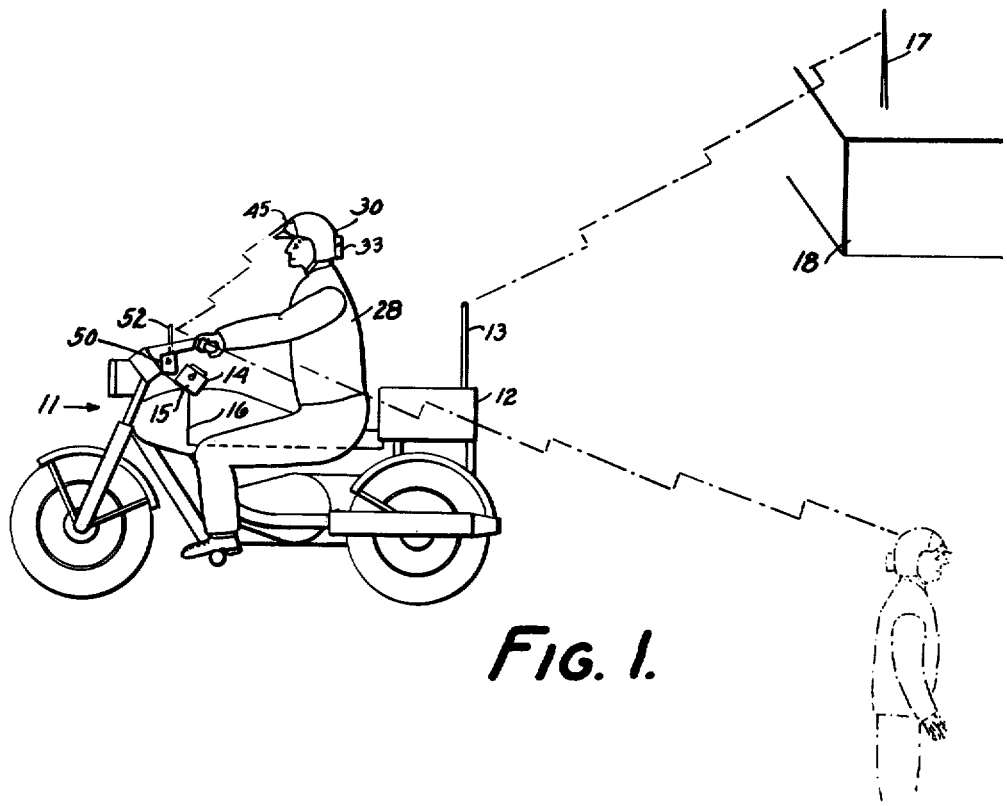
FIG. 1.
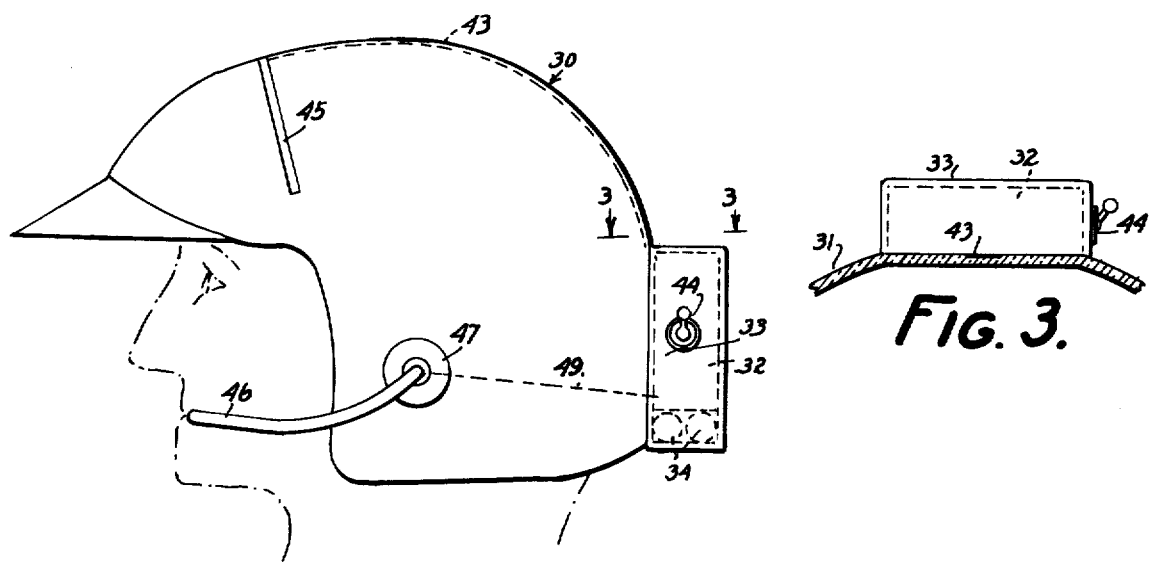
FIG. 2.
FIG. 3.

RADIO TRANSMISSION SYSTEM

BACKGROUND OF THE INVENTION

1. Field of the Invention

This invention relates to radio transmission systems and has particular reference to radio transmission systems used by emergency vehicle operators, such as law enforcement officers, firemen, etc.

2. Description of the Prior Art

Emergency vehicles generally carry radio communication apparatus for communicating with a central headquarters so that calls for help, reports, etc., can be made either while the vehicle is underway or is at a remote location.

When operating vehicles of the above type under high speed, various noises such as the sound of traffic, wind sounds, the roar of the engine, etc., tend to increase the background noise component to a point where it seriously interfers with the clarity and intelligibility of the message being transmitted. This is particularly true in the case of motorcycle law enforcement officers and others who operate vehicles which are not enclosed and are therefore subjected to the full effects of wind, vehicle, traffic and road noises.

In attempting to overcome the above problems, it has been the general practice heretofore to connect the vehicle radio transmitter to its microphone by a flexible conductingcable whereby the operator may hold the microphone directly adjacent to his mouth so as to keep out extraneous background noises. However, driving a motorcycle at high speeds and under emergency conditions is, at best, hazardous and becomes muchmore so if the operator must remove one of his hands from a handle bar to speak into the microphone. This also applies to a somewhat lesser extent to the operator of automobiles or the like.

Attempts have been made heretofore to free the operator from the need of holding the microphone while transmitting a message by mounting the microphone at a fixed location in front of the operator and on the vehicle. In this case, however, the operator must lean forward to get as close as possible to the microphone in order, again, to reduce the background noise to a minimum. This becomes equally dangerous since, in leaning forward, the operator must assume an unnatural driving position which tends to reduce his vision and driving ability.

Further, law enforcement officers, firemen, or the like, must often leave their vehicles, as when interrogating a suspect, and in such case they could not heretofore directly transmit radio messages calling for help or the like through the vehicle transmitter until they returned to the vehicle. Although portable "walkie-talkie" transceivers have been used to directly communicate with a control headquarters heretofore by law enforcement officers under similar situations, such transeivers, in order to be powerful enough to reach the headquarters under all conditions, are generally heavy, bulky and cumbersome and must be hand held in most cases.

SUMMARY OF THE INVENTION

According to the present invention, the vehicle operator is provided with a helmet containing a small, low-powered and therefore, light weight transmitter including a microphone which, when the helmet is in place, is located directly adjacent to the operator's mouth so as to reduce to a minimum the background noise. Such transmitter operates on a radio carrier frequency different from that of the main vehicle transmitter. Also, permanently mounted on the vehicle is a small, low-powered radio receiver turned to the frequency of the portable transmitter carried by the operator's helmet. Suitable means are provided to selictively switch the audio input of the vehicle transmitter to either the audio output of the low-powered receiver or to the conventional microphone for the vehicle transmitter so that the latter may, if desired be operated in the conventional manner.

Therefore, the operator may speak directly into his portable microphone with a minimum amount of background noise being picked up and without taking his hands off the vehicle controls or without otherwise diverting his attention from driving. The voice message is thus transmitted to the low-powered receiver on the vehicle and then by wire connection to the audio input of the main vehicle transmitter from whence it is transmitted in the usual manner to the central headquarters station on a different carrier frequency. Although the portable transmitter is of low-power, i.e., on the order of 50 to 100 milliwatts, it can still effectively transmit over an appreciable distance and, therefore, if the operator should leave the vehicle temporarily but stay within range, he can still transmit a radio message through the vehicle transmitter. If the portable transmitter should become disabled, for example, because of damage to the helmet, the operator can selectively set the transmitting switch to transmit in the conventional manner by speaking directly into the vehicle microphone.

It therefore becomes a principal object of the present invention to provide a radio transmission system for emergency vehicles which reduces to a minimum the background noise due to vehicle, wind and traffic sounds, or the like, and yet permit the operator to retain full control of his vehicle at all times.

Another object is to provide a radio transmission system for emergency vehicles which includes a portable transmitter carried by a helmet of the operator for transmitting a radio message to the main transmitter with means for selectively enabling the operator to by-pass the portable transmitter and directly transmit the message through the conventional microphone of the main vehicle transmitter.

BRIEF DESCRIPTION OF THE DRAWINGS

The manner in which the above and other objects and features of the invention are accomplished will be better understood on reference to the following specification when read in conjunction with the accompanying drawings, wherein:

FIG. 1 is a perspective view illustrating in general a preferred embodiment of the present invention.

FIG. 2 is a side view of the operator's helmet with a portable transmitter, microphone and antenna mounted thereon.

FIG. 3 is a sectional view taken along the line 3—3 of FIG. 2.

DESCRIPTION OF THE PREFERRED EMBODIMENT

Figure 4:
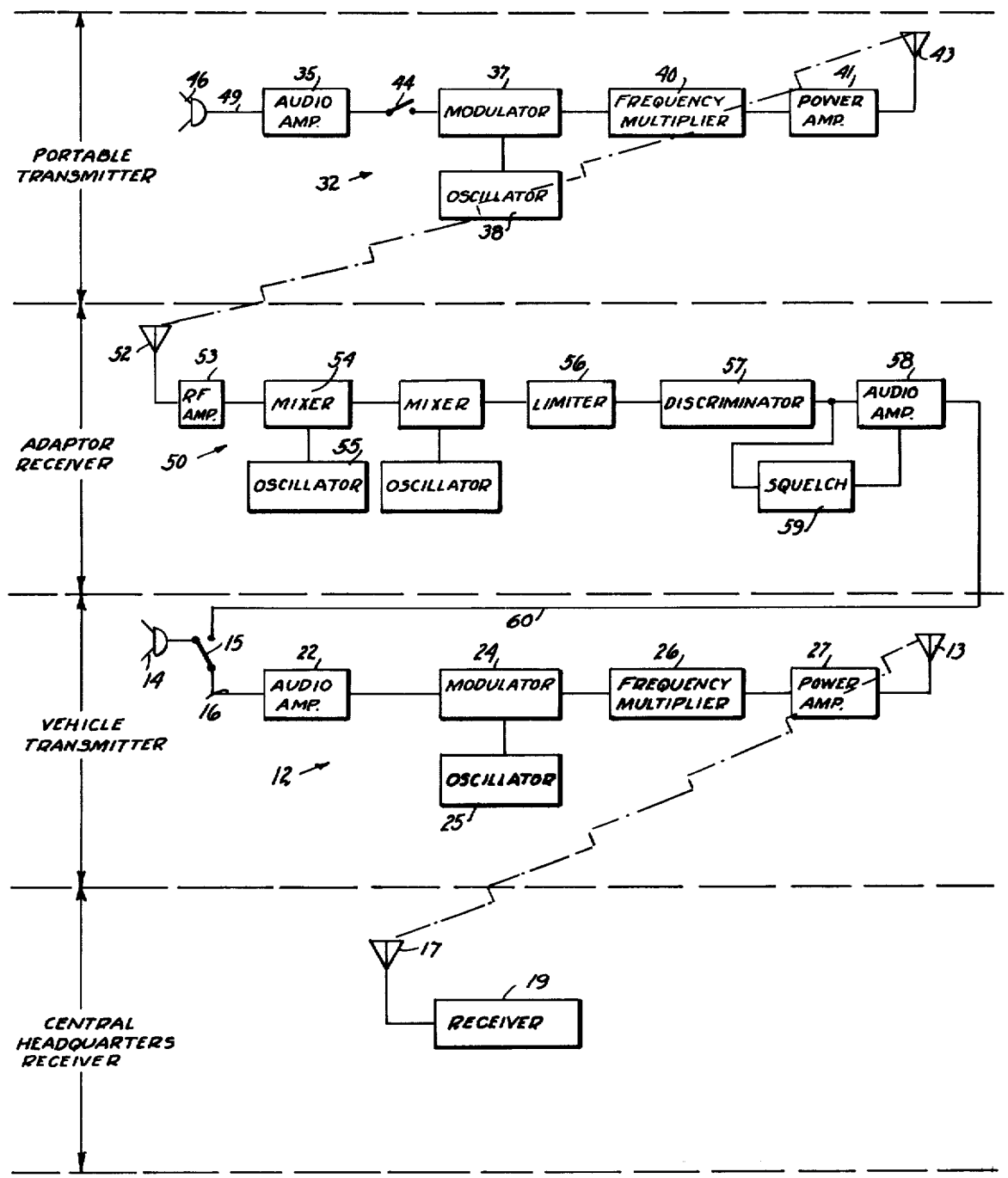
FIG. 4 is a block diagram of the circuitry embodied in a preferred embodiment.

Referring to FIGS. 1 and 4, an emergency vehicle, which is depected as a motorcycle 11, carries a conventional, relatively high powered radio transmitter 12, including an antenna 13. The transmitter may form part of a two-way radio or transceiver.

A microphone 14 is fixedly mounted on the motorcycle and is connected through a double-throw switch 15 and wire conductor 16 to the audio input circuit of the transmitter 12. By appropriately setting the switch 15, the motorcycle operator, when seated on the motorcycle or in close proximity thereto, may speak into the microphone 14 and transmit a voice message in the conventional manner. The voice signals will be transmitted by radio frequency carrier waves to the receiving antenna 17 of a receiver 19 located at a remote central headquarters, generally indicated at 18.

The transmitter 12 is of sufficient power, typically from 10 to 50 watts, so that the message can be adequately transmitted over a relatively long distance, that is, over any distance the motorcycle may be expected to travel from the central station and under any adverse conditions normally encountered.

For the purpose of illustration, the transmitter 12 is depicted as being of the frequency modulated type although amplitude modulated types could be employed. The transmitter includes an audio frequency amplifier 22, a modulator 24 which combines the output of oscillator 25 to produce a frequency modulated output which is fed to a frequency multiplier circuit or circuits 26 to provide the desired operating frequency. The output of the latter is amplified by amplifier circuit 27 and fed to the antenna 13. Frequency modulated transmitters of the above type are well known in the art and reference may be had to the book "*Elements of Radio*" by *Marcus and Marcus*, published by Prentice-Hall, Inc. Englewood Cliffs, New Jersey for a description of a typical frequency modulated transmitter.

In accordance with general practise a "press-to-talk" switch, not shown, is preferably mounted on the one of the handlebars and is suitably connected in circuit with the power supply of the transmitter 12 so that the latter is rendered effective only when the operator closes the switch.

The motorcycle operator 28a, typically a law enforcement office wears a removable protective helmet 30. Such helmet is preferably formed of a rigid plastic outer shell 31 (FIGS. 2 and 3) with a suitable padded interior (not shown) arranged to comfortably fit over the operator's head.

A small light weight radio transmitter, generally indicated at 32, of relatively low power, typically 50 to 100 milliwatts, is mounted within a small housing 33 suitably secured to the helmet shell 31. The transmitter 32 is self contained and includes power supply batteries 34 also located within the housing 33.

Although the transmitter 32 may be of any well known type it is shown as being of the frequency modulated type including an audio frequency amplifier 35 (FIG. 4), a modulator 37 for combining the output of the amplifier 35 with the output of an oscillator 38, a frequency multiplier 40 and a radio frequency power amplifier 41 which feeds the modulated radio frequency carrier to an antenna 43.

As shown in FIGS. 2 and 3, the antenna 43 is in the form of a metal strip suitably bonded to the outer surface of the plastic helmet shell 31.

Alternatively, the antenna may be embedded in the plastic material of the helmet. The antenna extends over the back surface of the helmet 30 and terminates in two oppositely extending branches, one of which is shown at 45. Thus, the antenna is inconspicuous and has no protruding parts. Also, since the antenna is curved in two planes at right angles to each other the full propogation pattern will not be affected if the operator should turn his head in any direction while transmitting.

Also included as part of the helmet is a tube type microphone 46 which is securely mounted at 47 to the side of the helmet 30 and extends directly adjacent the operator's mouth. The microphone 46 is electrically connected by conductor 49 to the audio input circuit of the transmitter 32. A toggle switch 44 is mounted on the side of the transmitter housing 33 and is connected in the circuit to permit the operator to selectively enable or disable the transmitter.

A small radio receiver 50 (FIGS. 1 and 4) is fixed on the motorcycle 11 and includes an antenna 52. Such receiver is preferably of the frequency modulation type capable of receiving radio transmission from the portable transmitter 32 and is therefore pre-tuned to the same carrier frequency. Such receivers are, in themselves, well known and described, for example, in the aforementioned reference book.

As shown in FIG. 4, the receiver 50 comprises a radio frequency amplifier 53, two stages of frequency conversion, each comprising a mixer circuit, i.e., 54, and an oscillator, i.e., 55. Included also is an amplitude limiter circuit 56 and a frequency discriminator circuit 57 for converting frequency modulations into an audio signal which is amplified by audio amplifier 58 and fed over line 60 to the aforementioned switch 15. A squelch circuit 59 of conventional design is provided to reduce noise.

It will be apparent from the foregoing that the light weight low powered transmitter 32 is entirely contained on the helmet 30 so that when the operator wears the helmet the microphone is always located directly adjacent his mouth. Thus, providing the switch 44 is closed, the operation may at any time transmit a radio message. Also, it will be noted that when traveling at high speeds any background noises caused by traffic, wind and the vehicle itself will be minimal. Furthermore, the operator may send a voice message at any time without having to divert his attention from driving or without having to remove his hand or hands from the handlebars or other vehicle controls.

DESCRIPTION OF ALTERNATE EMBODIMENTS

Figure 5:
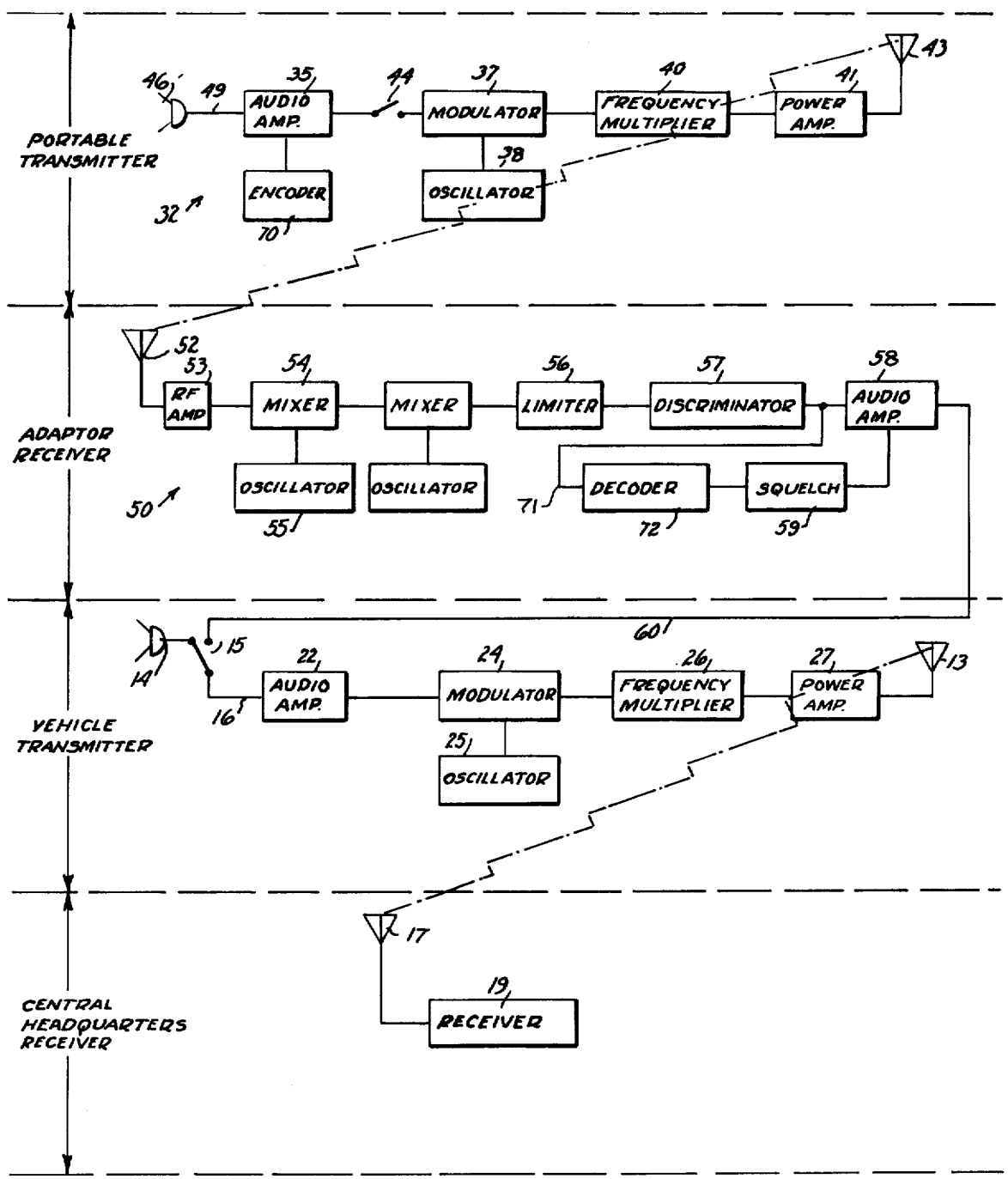
FIG. 5 is a block diagram of an alternative embodiment.
Figure 6:
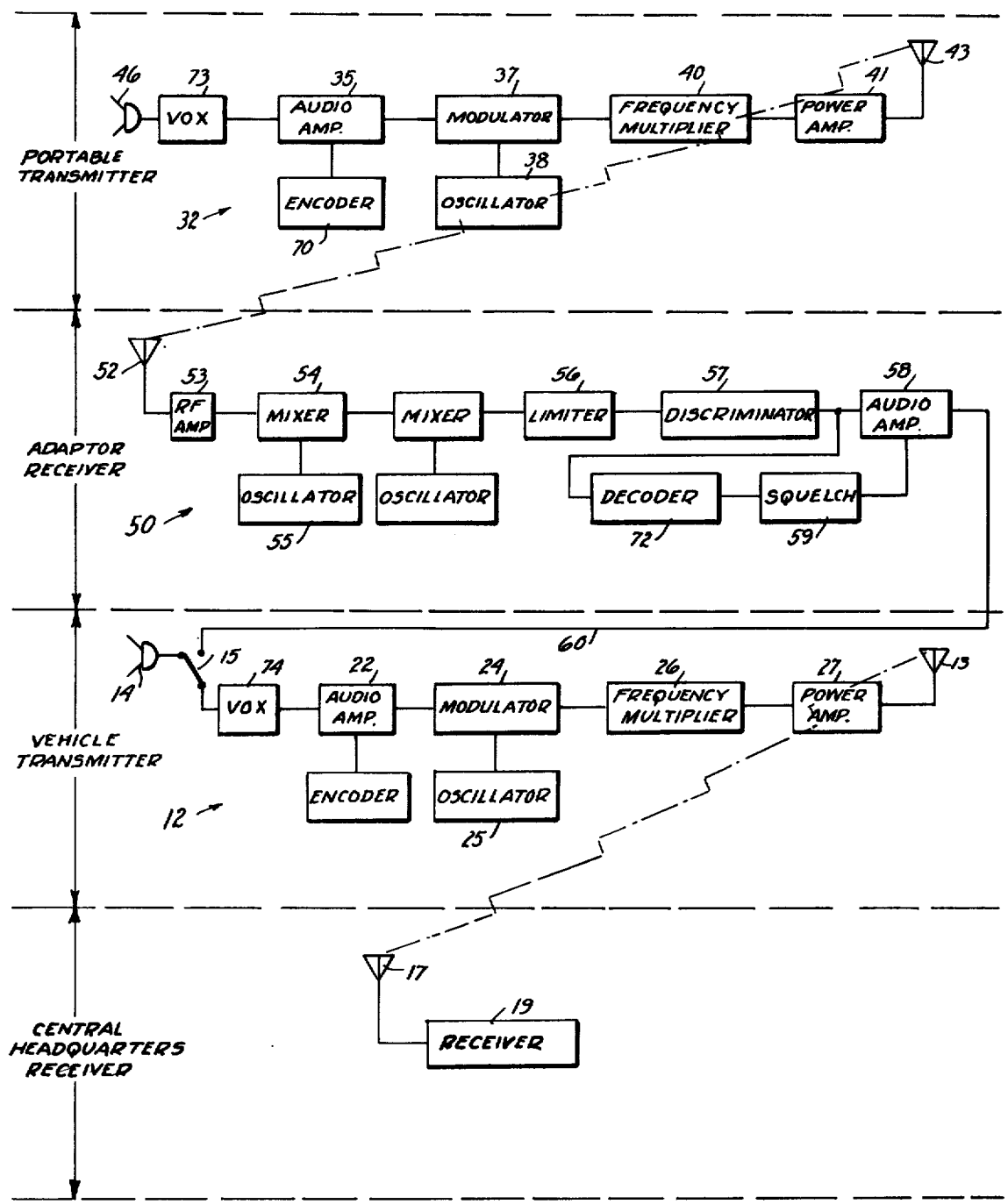
FIG. 6 is a block diagram of another alternative embodiment.

FIG. 5 illustrates a modified form of the invention in which parts similar to those of the FIG. 4 are indicated by similar reference numerals. Here, an encoder circuit 70 is provided to transmit a sub-audio selecting tone to the audio amplifier 35 at transmitter 32. This selecting tone is transmitted by the radio frequency carrier to the receiver 50 where it is fed over line 71 to a decoder circuit 72 which is tuned to the same selecting tone and thus controls the squelch circuit 59 to permit the audio amplifier 58 to pass the audio message over line 60. Such encoder and decoder circuits are old and well known in connection with other applications. FIG. 6 illustrates another modified form of the invention which is similar to that of FIG. 5 but in which a voice operated relay circuit 73 is connected between the microphone 46 and the audio amplifier 35. Such circuit 73 is operative to enable the transmitter 32 only when the level of the audio component transmitted by the microphone 46 is above a predetermined threshold value as when speaking directly into the portable microphone 46. Thus, the operator may dismount from the motorcycle, as when interrogating a subject, and yet be able to render both transmitters operative and to transmit a message to the central headquarters 18 at any time by merely speaking into the portable microphone 46.

Voice operated relay circuits suitable for the above purpose are well known in the art and reference may be had to the article "Voice Controlled Break-In--And a Loudspeaker" by Nowak, published in the May 1951 edition of the QST Magazine which is made a part hereof.

In this case, the aforementioned "press-to-talk" switch would, of course, be omitted.

I claim:

1. A radio transmission system for use by the operator of a vehicle operating under relatively high background noise conditions,
    said vehicle carrying a first relatively high powered radio transmitter having a first radio frequency output circuit and an audio frequency input circuit comprising:
    a removable helmet carried by said operator,
    a second relatively low powered radio transmitter carried by said helmet,
    a microphone electrically connected to said second transmitter,
    said microphone being carried by said helmet adjacent said operators mouth, and
    an antenna integral throughout its length with said helmet and electrically connected to said second transmitter;
    a radio receiver carried by said vehicle for receiving radio frequency signals transmitted by said second transmitter,
    said receiver having an audio frequency output circuit, and
    means connecting said audio frequency output circuit to said audio frequency input circuit of said first transmitter.

2. A radio transmission system as defined in claim 1 wherein said first transmitter includes a second microphone, and
    switch means for selectively connecting said second microphone or said audio frequency output circuit of said receiver to said audio frequency input circuit of said first transmitter.

3. A radio transmission system as defined in claim 1 wherein said second transmitter comprises a second audio frequency input circuit,
    said first mentioned microphone being normally disconnected from said second audio frequency input circuit, and
    voice controlled switching means for connecting said first mentioned microphone to said second audio frequency input circuit when said operator speaks into said first mentioned microphone.

* * * * *